United States Patent [19]

Murakami

[11] Patent Number: 4,849,786

[45] Date of Patent: Jul. 18, 1989

[54] PAPER STACKING APPARATUS FOR IMAGE FORMING APPARATUS

[75] Inventor: Reiji Murakami, Yokohama, Japan

[73] Assignee: Kabushiki Kaisha Toshiba, Kawasaki, Japan

[21] Appl. No.: 108,641

[22] Filed: Oct. 15, 1987

[30] Foreign Application Priority Data

Oct. 16, 1986 [JP] Japan ................................ 61-244081

[51] Int. Cl.[4] ................................................ F03G 15/00

[52] U.S. Cl. ...................................... 355/311; 271/3.1; 355/319; 355/322

[58] Field of Search ............ 355/3 SH, 14 SH, 23-26; 271/3.1, 162.4, 171, 223, 233, 272, 248-150, 252; 162/271

[56] References Cited

U.S. PATENT DOCUMENTS

| | | | |
|---|---|---|---|
| 2,368,098 | 1/1945 | Bellache | 271/252 |
| 4,326,915 | 4/1982 | Mutschler, Jr. | 355/3 SH Y |
| 4,379,549 | 4/1983 | Mizuma | 271/251 X |
| 4,591,259 | 5/1986 | Kuo et al. | 355/3 SH |
| 4,607,948 | 8/1986 | Naito | 355/24 |
| 4,745,439 | 5/1988 | Hanada et al. | 355/14 SH |

FOREIGN PATENT DOCUMENTS 59-211063 11/1984 Japan ................................ 355/14 SH

OTHER PUBLICATIONS

Abstract of Japanese Laid Open Application 61-151555, 7-1986.

*Primary Examiner*—Arthur T. Grimley
*Assistant Examiner*—J. Pendegrass
*Attorney, Agent, or Firm*—Foley & Lardner, Schwartz, Jeffery, Schwaab, Mack, Blumenthal & Evans

[57] ABSTRACT

In an image forming apparatus provided with both-side copying and overcopying functions, a copied paper is fed into a paper stacking unit before being fed again. In the conventional paper stacking unit, since the unit is disposed horizontally, there exists a problem in that paper is not well aligned, thus resulting in paper jamming, double paper feeding, etc. To overcome this problem, the paper stacking unit is disposed with an inclination angle paper feed-out side up. For further improving paper feed reliability, the stacking unit includes a paper lifting device, a paper side alignment device, and a paper curl correcting device.

6 Claims, 4 Drawing Sheets

PAPER STACKING APPARATUS FOR IMAGE FORMING APPARATUS

BACKGROUND OF THE INVENTION

1. Field of the Invention

The present invention relates to an image forming apparatus more specifically to an image forming apparatus provided with double-side copying and overcopying functions in which copied paper is fed once into a paper stacking unit before being fed again.

2. Description of the Prior Art

Recently, there have been developed electronic copying machines such that two different images can be copied on one (overcopy) or both sides (double-side copy) of the same copying paper. In these copying machines, a paper refeed loop is provided to feed a copied paper again to a copying position as it is or after the paper is turned inside out. In these copying machines provided with a paper refeed loop mechanism, usually a copied paper stacking unit for temporarily storing copied paper (before the paper is fed again to a copying position via the paper refeeding loop) is provided in order to solve the problems associated with time lag between a first right side copy and a second reverse side copy or an overcopy sequence.

In the conventional electronic copying machine provided with the above-mentioned paper refeeding mechanism, however, the copied paper stacking unit is disposed horizontally within the paper refeed loop mechanism, there exists a problem such that the end of copied paper is not well aligned, thus resulting in paper jamming, double paper feeding, etc. Further, when copied papers are fed in misaligned condition, there exists another problem in that two images copied on both sides of the paper are not well matched in position or two images copied on the same side of the paper are not well aligned with each other in position.

SUMMARY OF THE INVENTION

With these problems in mind, therefore, it is the primary object of the present invention is to provide an image forming apparatus provided with a copied paper stacking unit for once stacking copied paper under good alignment condition in order to prevent paper jamming, double paper feed, copied image misalignment, etc. due to paper end misalignment.

To achieve the above-mentioned object, an image forming apparatus for effecting at least two image forming processings on a single paper according to the present invention, comprises: (a) means for forming an image onto the paper; (b) means for feeding the paper to said image forming means; (c) means for refeeding the paper onto which at least one image has been formed by said image forming means to said image forming means; and (d) means for once stacking the paper before the paper is refed by said paper refeeding means, said paper stacking means being disposed with an angle of inclination.

The paper stacking means further comprises (a) means for lifting the copied paper of different sizes stacked in said stacking means to a predetermined paper feed position irrespective of paper size; (b) means for aligning the side of the copied paper of different sizes stacked in said stacking means to a predetermined position according to paper size; and (c) means for correcting paper curl before the copied paper is fed to said stacking means.

Copied paper fed to the stacking means is aligned by its weight at the lower end thereof and by the side aligning means at the side thereof, it is possible to solve various paper feed problems due to paper end misalignment.

BRIEF DESCRIPTION OF THE DRAWINGS

The features and advantages of the image forming apparatus according to the present invention will be more clearly appreciated from the following description of the preferred embodiment of the invention taken in conjunction with the accompanying drawings in which.

DETAILED DESCRIPTION OF THE PREFERRED EMBODIMENTS

Embodiments of the image forming apparatus of the present invention will be described hereinbelow with reference to the attached drawings.

Figure 1:
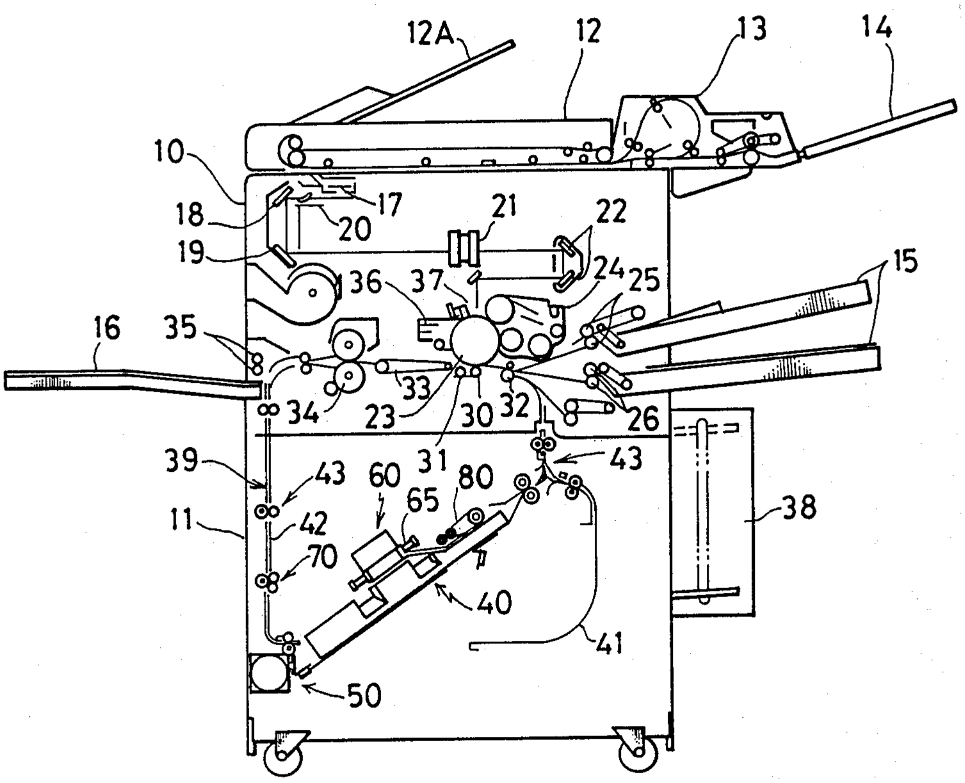
FIG. 1 is a diagrammatical side view of an image forming apparatus of the present invention.

In FIG. 1, an image forming apparatus can roughly be divided into an upper unit casing 10 for housing the major part of the apparatus and a lower unit casing 11 disposed under the upper unit casing 10 integral therewith.

In the upper unit casing 10, there are arranged an original feed mechanism 12 including an original cover 12A, an original reversing mechanism 13, and an original feed base 14.

An original is set on the original feed base 14. The original feed mechanism 12 takes in an original placed on the original feed base 14, feeds the original along the upper surface of the upper unit casing 10, and discharges the original on the upper surface of the mechanism 12.

The original reversing mechanism 13 is used to copy both the sides of an original. That is, after one surface of an original has been copied, the copied original is further introduced into the original reversing mechanism 13 to reverse the original and then discharged on the upper surface of the original feed mechanism 12.

On one side of the upper unit casing 10, a pair of upper and lower paper cassettes 15 are removably provided. On the other side of the upper unit casing 10, a discharged paper tray 16 is disposed.

Within the upper unit casing 10, there is arranged the major part of the copying machine such as an optical system including an exposure lamp 17 moved to and fro along the under surface of the original feed mechanism 12, mirrors 18, 19 and 20, a variable power lens block 21, and mirrors 22; a photosensitive drum 23 onto which images of an original are formed through the optical system; a developing unit 24 for applying toner onto an electrostatic latent image formed on the surface of the photosensitive drum 23 to change the latent image into a visible image; paper feed rollers 25 and 26 for feeding out copying paper arranged on the cassettes 15 in synchronism with the motion of the photosensitive drum 23; and image transferring electrifying unit 30 for transferring a toner image onto the paper; a paper removing electrifying unit 31 for removing paper from the drum 23; a pair of resist rollers 32 for bringing copy paper into contact with the surface of the drum 23; a paper carry belt 33 for carrying a copied paper removed from the drum 23; a pair of fixing rollers 34 for fixing the toner image to the paper; and a pair of paper discharge rollers 35 for discharging copied papers onto the tray 16.

Further, on the periphery of the photosensitive drum 23, there are arranged a cleaner unit 36 for deelectrifying the photosensitive drum 23 (after image transfer) along the rotational direction thereof and for removing toner stuck onto the surface of the photosensitive drum 23 after deelectrification, and an electrifying unit 37 for electrifying the surface of the drum 23 to form an electrostatic latent image thereon when an image is exposed.

Within the lower unit casing 11, there is arranged a copied paper refeed mechanism for feeding again already-copied paper to the photosensitive drum 23 in non-reversed or reversed condition. The refeed mechanism is roughly composed of a closed paper feed loop mechanism 39 communicating with the paper feed position and the paper discharge position in the upper unit casing 10, and a copied paper stacking unit 40.

When a reverse mode presetting device (not shown) or a overcopy mode presetting device (not shown) is actuated, a copied paper to be discharged toward the discharge tray 16 is switched so as to be fed into the paper feed loop 39 mechanism, so that the copied paper fed out from the photosensitive drum 23 is introduced again into the lower unit casing 11.

The copied paper introduced into the feed loop mechanism 39 is once stored in the copied paper stacking unit 40 in stacked condition and then fed to the photosensitive drum 23 again.

Further, a paper reversing guide member 41 is provided on the paper feed-out side of the paper stacking unit 40.

Figure 2:
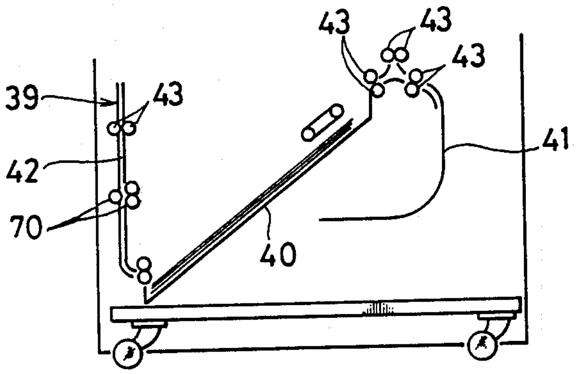
FIG. 2 is an illustration for assistance in explaining a paper reversing mechanism incorporated in the apparatus shown in FIG. 1.
Figure 3:
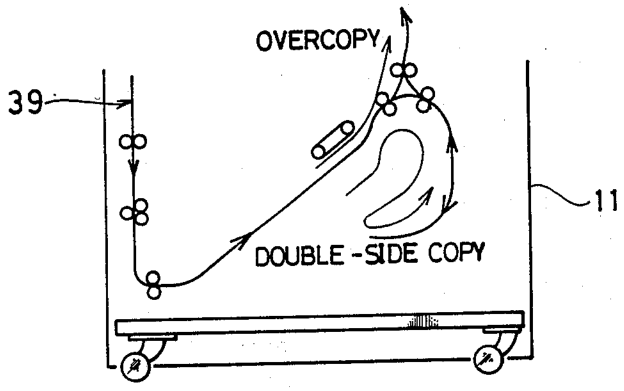
FIG. 3 is an illustration for assistance in explaining paper feed directions of the paper reversing mechanism shown in FIG. 2.

As depicted in FIG. 2, the above paper feed loop mechanism 39 includes a paper feed guide 42 and a number of paper feed rollers 43, each pair being opposingly disposed with the paper feed guide 42 sandwiched between the two opposing rollers.

The first feature of the present invention is to provide the copied paper stacking unit 40 of tray type within the lower unit casing 11 at an inclination angle in such a way that its paper feed-in side is located on the lower side and its paper feed-out side is located on the upper side. Copied paper circulating along the paper feed loop mechanism 39 within the lower unit casing 11 is supplied from the lower portion of this stacking unit 40, being stored thereat, and fed out again from the upper portion of this stacking unit 40.

Since the stacked copied paper is brought into contact with a guide member (described later) of the stacking unit 40 by the weight of paper itself into an alignment condition, the lower end of the circulated paper is aligned from any misaligned condition by the stacking unit 40.

When both the sides of paper are required to copy, the copied paper to be refed from the stacking unit 40 is once introduced along the paper reversing guide 41 and then fed to the photosensitive drum 23 through the feed loop mechanism 39, so that the reverse side of the paper (the right side of which has already been copied) is brought into contact with the surface of the photosensitive drum 23.

Further, since a large fixed paper tray 38 communicating with the photosensitive drum 23 is disposed on the side of the lower unit casing 11, even if the stacking unit 40 is disposed being inclined, it is possible to effectively utilize the space of the lower unit casing 11.

As described above, according to the first feature of the present invention, copied paper introduced into the paper stacking unit is brought into contact with the paper guide member of the stacking unit into alignment condition. Therefore, it is possible to effectively prevent paper jamming, double paper feeding, copy position (image) mismatching, etc. due to the misalignment of copied paper to be copied again for double-side copy or overcopy.

The second feature of the image forming apparatus according to the present invention is to provide a paper lifting device 50 for the paper stacking unit 40.

Figure 4:
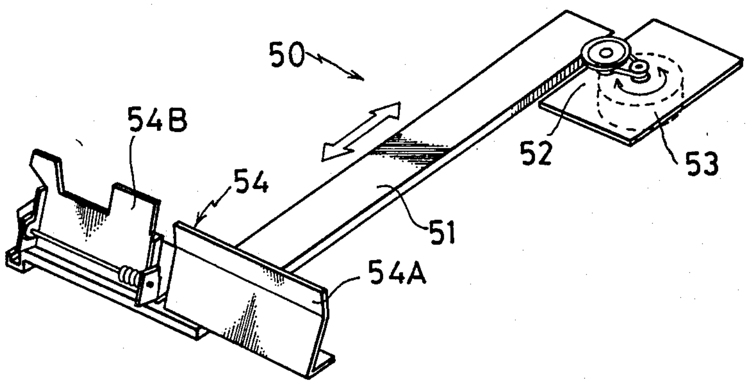
FIG. 4 is a perspective view showing a paper lifting device incorporated in the paper stacking unit of the present invention.

With reference to FIG. 4, the paper lifting device 50 comprises a rack 51 arranged along the longitudinal direction of the paper stacking unit 40, a pinion 52 in mesh with the rack 51, a lifter-guide motor 53 for driving the pinion 52 to move the rack upward or downward to a predetermined position according to the length of paper, and a paper length guide member 54 having a fixed guide member 54A and a slidable guide member 54B adjustably movable relative to the fixed guide member 54A.

This paper lifting device 50 serves to lift paper of different length to a predetermined paper feed start position under alignment condition for paper length adjustment. Although the lift stroke of paper is different according to the length of stacked paper, since paper of different sizes can be lifted to the same feed start position by means of a simple paper lifting device, it is unnecessary to adjust roller drive duration or jam detection timing, thus improving the paper feed reliability.

The third feature of the image forming apparatus according to the present invention is to provide a paper side aligning device 60 for the paper stacking unit 40.

Figure 5:
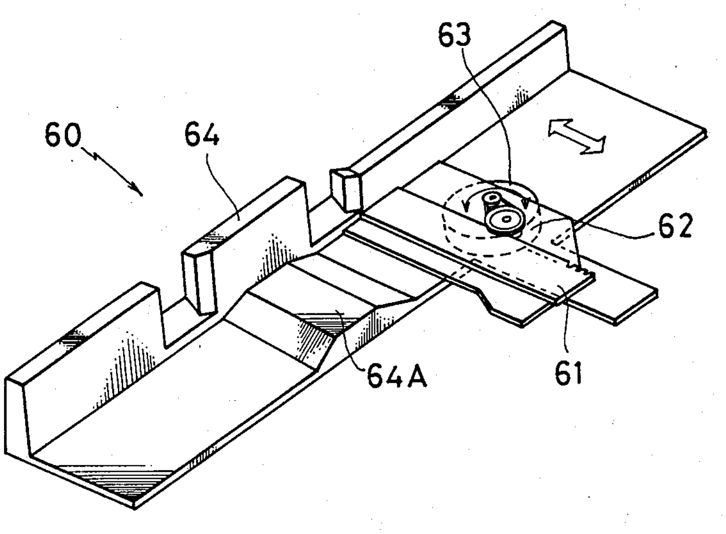
FIG. 5 is a perspective view showing a paper side aligning device incorporated in the paper stacking unit of the present invention.

With reference to FIG. 5, the paper side aligning device 60 comprises a rack 61 extending in the transverse direction of the paper stacking unit 40, a pinion 62 in mesh with the rack 61, a guide motor 63 for driving the pinion 62 to move the rack to and fro to a predetermined position according to the width of paper, a paper width guide member 64 formed with a trapezoid projection 64A, and a side alignment roller 65 (shown in FIG. 1).

This paper side aligning device 60 serves to shift paper of different width to a predetermined paper side position under alignment condition for paper width adjustment.

In more detail, the paper width guide member 64 is first adjusted by the motor 63 via the rack 61 and pinion 62 to a predetermined position according to the size of paper. Further, when paper is stacked in the paper stacking unit 40, the side alignment roller 65 comes down (vertically) into contact with the paper and brings the paper (horizontally) into contact with the paper width guide member 64 for paper side alignment (since no weight is applied to the paper in the sideward direction).

Further, in FIG. 5, the trapeziod projection 64A serves to strengthen the paper when shifted sideward into contact with the paper width guide member 64.

With respect to the mutual positional relationship between the two devices 50 and 60, the side alignment roller 65 is appropriately positioned relative to the lifting device 50. Therefore, the paper stacked in the stacking unit 40 can be positioned and aligned at a predetermined position in both longitudinal and transverse directions by the paper lifting device 50 and the paper aligning device 60.

The fourth feature of the image forming apparatus according to the present invention is to provide a curl correction roller assembly 70 between the fixing rollers 34 and the paper stacking unit 40 and after the paper feed switching gate.

Figure 6:
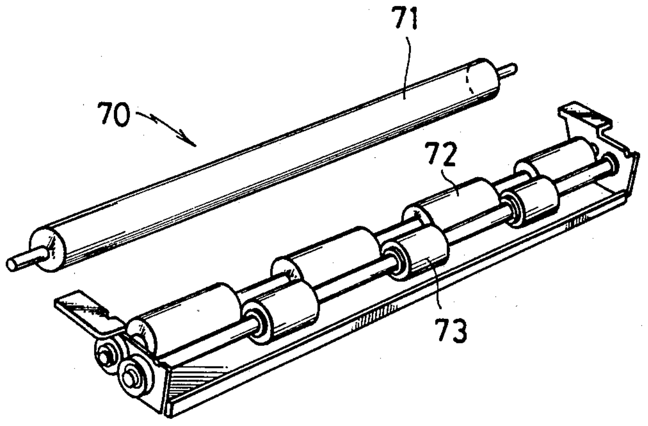
FIG. 6 is a perspective view showing an essential portion of a paper curl correcting device.

With reference to FIG. 6 the curl correction roller assembly 70 comprises a continuous roller 71, a second intermittent roller 72, and a third intermittent roller 73. The second and third intermittent rollers 72 and 73 are alternately overlapped each other with each roller portion engaged with each cavity portion thereof in zigzag fashion. Further, these two rollers 72 and 73 are brought into pressure contact with the first continuous roller 71.

Since the paper passed through the fixing rollers 34 is heated, when the feed direction of the heated paper is changed, the paper is easily curled, thus resulting in paper jamming or paper misalignment.

In the present invention, the paper is squeezed through the curl correcting roller assembly 70 during paper feeding, it is possible to eliminate the paper curl. Further, in the structure of the curl correcting device 70 of the present invention, since it is possible to increase the diameter of the rollers 71, 72 and 73 without need of a large roller mounting space. Therefore, it is possible to readily feed the curled paper into between the relatively large diameter first roller 71 and the second, third rollers 72, 73.

The operation of paper stacking and feeding to or from the paper stacking unit 40 will be described. The paper width guide member 64 is shifted outward a little; the paper length guide member 54 is lowered a little. Under these conditions, paper is inserted and stacked in the paper stacking unit 40. The paper side aligning device 60 is located to a predetermined position according to paper size, and further the paper lifting device 50 is located to a predetermined height. Under these conditions, the longitudinal side of the paper is aligned by the weight and the paper length guide member, and the transverse side of the paper is aligned by the side alignment roller 65 and the paper width guide member 64. Thereafter, a pick-up roller 80 (shown in FIG. 1) comes down into contact with the aligned paper to feed the paper upward one by one toward the paper feed rollers 43.

What is claimed is:

1. An image forming apparatus for effecting two image forming processes on a single sheet of paper, comprising:

(a) means for forming an image on the paper;

(b) means for feeding the paper to said image forming means;

(c) means for refeeding to said image forming means the paper on which at least one image has been formed by said image forming means;

(d) means for once stacking the paper before the paper is refed by said paper refeeding means, said paper stacking means being disposed with an angle of inclination; and (e) means for lifting copied paper of different sizes stacked in said stacking means to a predetermined position, irrespective of paper size, said lifting means disposed in lower part of said stacking means and including:

(1) a rack extending along a longitudinal direction of said paper stacking means;

(2) a pinion in mesh with said rack;

(3) a lifter guide motor for driving said pinion to move said rack up and down; and (4) a paper length guide member attached to a lower portion of said rack to align the lower end of paper on the basis of paper weight.

2. An image forming apparatus for effecting two image forming processes on a single sheet of paper, which comprises:

(a) means for forming an image on the paper;

(b) means for feeding the paper to said image forming means;

(c) means for refeeding the paper on which at least one image has been formed by said image forming means to said image forming means;

(d) means for once stacking the paper under inclined condition before the paper is refed by said paper refeeding means, said paper being fed from a lower side of said paper stacking means and refed from an upper side of said paper stacking means;

(e) means for lifting copied paper of different sizes stacked in said stacking means to a predetermined paper feed position irrespective of paper size, said lifting means being disposed in lower part of said stacking means to align a lower end of paper on the basis of paper weight; and (f) means for aligning a side of the copied paper of different sizes stacked in said stacking means to a predetermined position according to paper size, said aligning means being disposed at the middle of said stacking means to align a side end of paper by a roller.

3. An image forming apparatus for effecting at least two image forming processes on a single sheet of paper, comprising:

means for forming an image on the paper;

means for feeding the paper to said image forming means;

means for refeeding the paper on which at least one image has been formed to said image forming means;

means for once stacking the paper in an inclined condition before the paper is refed by said paper refeeding means, said paper being fed from a lower side of said paper stacking means and refed from an upper side of said paper stacking means; and means for lifting copied paper of different sizes stacked in said stacking means to a predetermined position on the upper side of said paper stacking means, irrespective of paper size, said lifting means disposed in the lower part of said stacking means and including:

a rack extending along a longitudinal direction of said paper stacking means;

a pinion in mesh with said rack;

a lifter guide motor for driving said pinion to move said rack up and down; and a paper length guide member attached to a lower portion of said rack to align the lower end of paper on the basis of paper weight.

4. The apparatus as set forth in claim 1, which further comprises means for correcting paper curl before the copied paper is fed to said stacking means, said curl correcting means disposed upstream of said stacking means, including:

(a) a first continuous roller;

(b) a second intermittent roller;

(c) a third intermittent roller, said second and third rollers being alternately overlapped with each other, each roller portion engaged with each cavity portion thereof in zigzag fashion and brought into pressure contact with said first roller.

5. An image forming apparatus for effecting at least two image forming processes on a single sheet of paper, comprising:

means for forming an image on the paper;

means for feeding the paper to said image forming means;

means for refeeding the paper on which at least one image has been formed to said image forming means;

means for once stacking the paper in an inclined condition before the paper is refed by said paper refeeding means, said paper being fed from a lower side of said stacking means and refed from an upper side of said paper stacking means; and means for aligning a side of copied paper, said aligning means disposed at the middle of said stacking means and including:

a rack extending along a transverse direction of said paper stacking means;

a pinion in mesh with said rack;

a side alignment motor for driving said pinion to move said rack to and fro;

a paper width guide member attached to one side of said rack and extending perpendicularly to said rack; and a side alignment roller for bringing paper in said stacking means into contact with said paper width guide member for paper side alignment.

6. The apparatus as set forth in claim 5, which further comprises means for correcting paper curl before the copied paper is fed to said stacking means, said curl correcting means disposed upstream of said stacking means, including:

(a) a first continuous roller;

(b) a second intermittent roller;

(c) a third intermittent roller, said second and third rollers being alternately overlapped with each other, each roller portion engaged with each cavity portion thereof in zigzag fashion and brought into pressure contact with said first roller.

* * * * *